J. VORRABER.
SELF ADJUSTING ANTIFRICTION BEARING.
APPLICATION FILED OCT. 2, 1915.
1,172,648.
Patented Feb. 22, 1916.
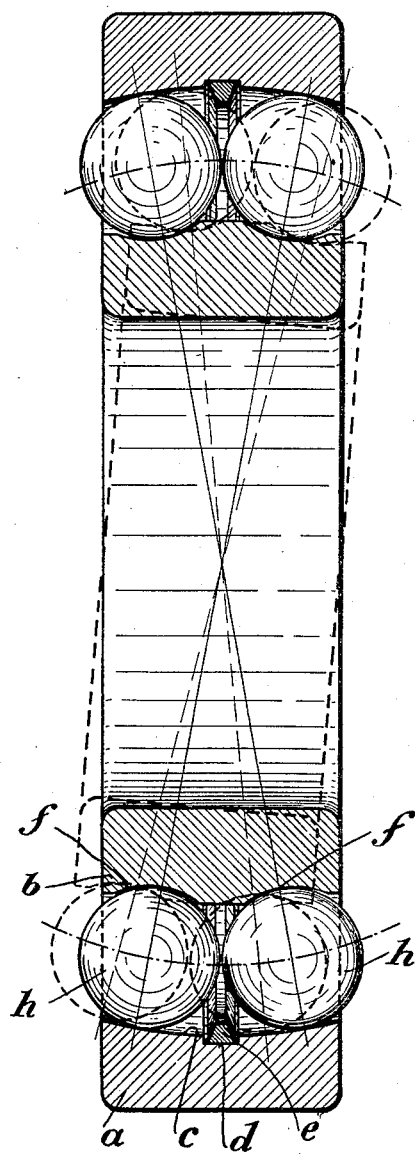

UNITED STATES PATENT OFFICE.

JOSEF VORRABER, OF MUNICH-TRUDERING, GERMANY.

SELF-ADJUSTING ANTIFRICTION-BEARING.

1,172,648.  Specification of Letters Patent.  Patented Feb. 22, 1916.

Application filed October 2, 1915. Serial No. 53,774.

*To all whom it may concern:*

Be it known that I, JOSEF VORRABER, of 22 Auerfeldstrasse, Munich-Trudering, Bavaria, Germany, civil engineer, have invented certain new and useful Improvements in Self-Adjusting Antifriction-Bearings, of which the following is a specification.

My invention relates to antifriction bearings and more particularly to that class thereof wherein two rows of balls are inclosed between an external casing or ring having a spherically formed inner surface and a self-adjusting inner casing member or ring.

It is the object of my invention to provide a bearing of this kind which does not require the use of cages preventing the balls from falling out and which nevertheless allows of freely introducing the balls between the races without any danger of their falling out again although the inner ring may assume a very oblique position.

More specifically, the bearing consists of an external ring having a spherically-formed concave inner surface and a groove in the middle of said inner surface extending all over the circumference of said inner surface, of a closed ring inserted within said groove and serving as an abutment for the balls whenever the inner ring assumes an oblique position, and of an inner casing member externally provided with two spherically-formed races.

In the drawings affixed to this specification the preferred form of an antifriction bearing according to the present invention is shown in a transverse sectional view.

$a$ is the external casing or ring, $b$ is the inner casing member.

$c$ is the spherically formed inner surface of ring $a$, $d$ is the circumferential groove provided in the middle of said surface, $e$ is the closed ring arranged within said groove and projecting into the space inclosed between ring $a$.

$f, f$ are the circumferential races arranged in the outer surface of ring $b$, $g$ is a ring-shaped projection separating said races, $h$ are the balls alternately arranged in two rows between said races $f$ and the spherical surface $c$.

In making and assembling the different parts of this bearing I proceed as follows: First of all the external ring $a$ is provided with the spherical inner surface by grinding as usual, the surface being highly polished. Thereafter the circumferential groove $d$ is ground in the middle line of said spherical surface and a closed ring $e$ inserted in said groove. Said ring having its ends jointed together by soldering or welding may first be subjected to a deformation allowing of its being introduced into the groove $d$ whereupon the ring is given its original shape by rolling. The ring $e$ having thus been brought in its place it cannot be removed any more from the interior of the external casing $a$. Now the inner casing member or ring $b$ is arranged within the external casing in an oblique position (as shown in the drawing in dotted lines) and the balls are inserted one by one at the point projecting farthest from the space inclosed by the external ring $a$. This is easily effected by exerting a slight pressure upon each ball in an inward direction, and it is equally feasible to remove the rings in the same points by exerting upon them an outwardly directed pressure. Under no condition however will the balls slip out by themselves nor will the inner casing member $b$ be able to assume an oblique position beyond the one shown in the drawings where the uppermost and the lowermost balls, one on each side, have struck the closed ring $e$ which thus serves as an abutment preventing the inner casing member and the balls from falling out by themselves, although the balls can be introduced and removed by hand, and no special locking means such as closed cages or the like are needed. On the other hand a broken ball can freely fall out of the bearing thus preventing it from being destroyed.

Obviously many changes and variations may be made in the bearing as shown in the drawing and described in the specification without departure from the spirit of my invention; and, generally speaking, I do not desire to limit myself to any specific forms except in so far as such limitations are specified in the claims.

I claim herein as my invention:

1. In a self-adjusting antifriction bearing, in combination an external casing member, having a spherically formed concave inner surface, a narrow ring-shaped projection in the middle of said inner surface, an inner casing member, said inner casing member provided with two ball races in its outer surface, and two rows of balls arranged between said ball races and the spherical inner surface of said external member.

2. In a self-adjusting antifriction bearing, in combination an external casing member, said member having a spherically formed concave inner surface, a narrow circumferential groove in the middle of said inner surface, a closed ring inserted in said groove, an inner casing member, said inner casing member provided with two ball races in its outer surface, and two rows of balls arranged between said ball races and the spherical inner surface of said external member.

In testimony whereof, I affix my signature, in presence of two witnesses.

JOSEF VORRABER.

Witnesses:
W. S. SPIEGELBERG,
AUGUSTE DIEHL.